United States Patent [19]
Breer et al.

[11] 3,858,852
[45] Jan. 7, 1975

[54] MACHINE FOR INTERMITTENTLY FILLING MOULDS OR CAVITIES WITH A REACTIVE PLASTICS-FORMING, MORE PARTICULARLY FOAM-FORMING MIXTURE

[75] Inventors: Karl Breer, Koeln; Klaus Nadolski, Bergisch-Neukirchen, both of Germany

[73] Assignee: Bayer Aktiengesellschaft, Leverkusen, Germany

[22] Filed: Feb. 12, 1973

[21] Appl. No.: 331,402

[30] Foreign Application Priority Data
Feb. 26, 1972   Germany............................ 2209168

[52] U.S. Cl. .................................................. 259/4
[51] Int. Cl. ............................................. B01f 15/04
[58] Field of Search ............... 259/4, 7, 8, 9, 10, 5, 259/6, 18, 19, 23, 24; 137/87, 88

[56] References Cited
UNITED STATES PATENTS
| | | | |
|---|---|---|---|
| 2,847,196 | 8/1958 | Franklin | 259/8 |
| 3,123,342 | 3/1964 | Little | 259/7 |
| 3,141,865 | 7/1964 | McEvoy | 259/8 |
| 3,257,175 | 6/6966 | Brooks | 259/7 |
| 3,265,365 | 8/1966 | Ward | 259/8 |

*Primary Examiner*—Robert W. Jenkins
*Attorney, Agent, or Firm*—Burgess, Dinklage & Sprung

[57] ABSTRACT

A machine is provided for filling moulds or cavities with foam, the machine comprising control slides located in the pipes for at least two- free-flowing foam-forming components, the control slides being coupled together in terms of movement techology which through their guide channels connect the pumps with the mixing head in the "throughflow position" and interrupt the pressure-side pipe system in the interrupting position in which those parts of the pressure side pipe sections which extend between the control slides and the shut-off members arranged on the mixing head are connected through additional guide channels with pressure-relief system.

12 Claims, 6 Drawing Figures

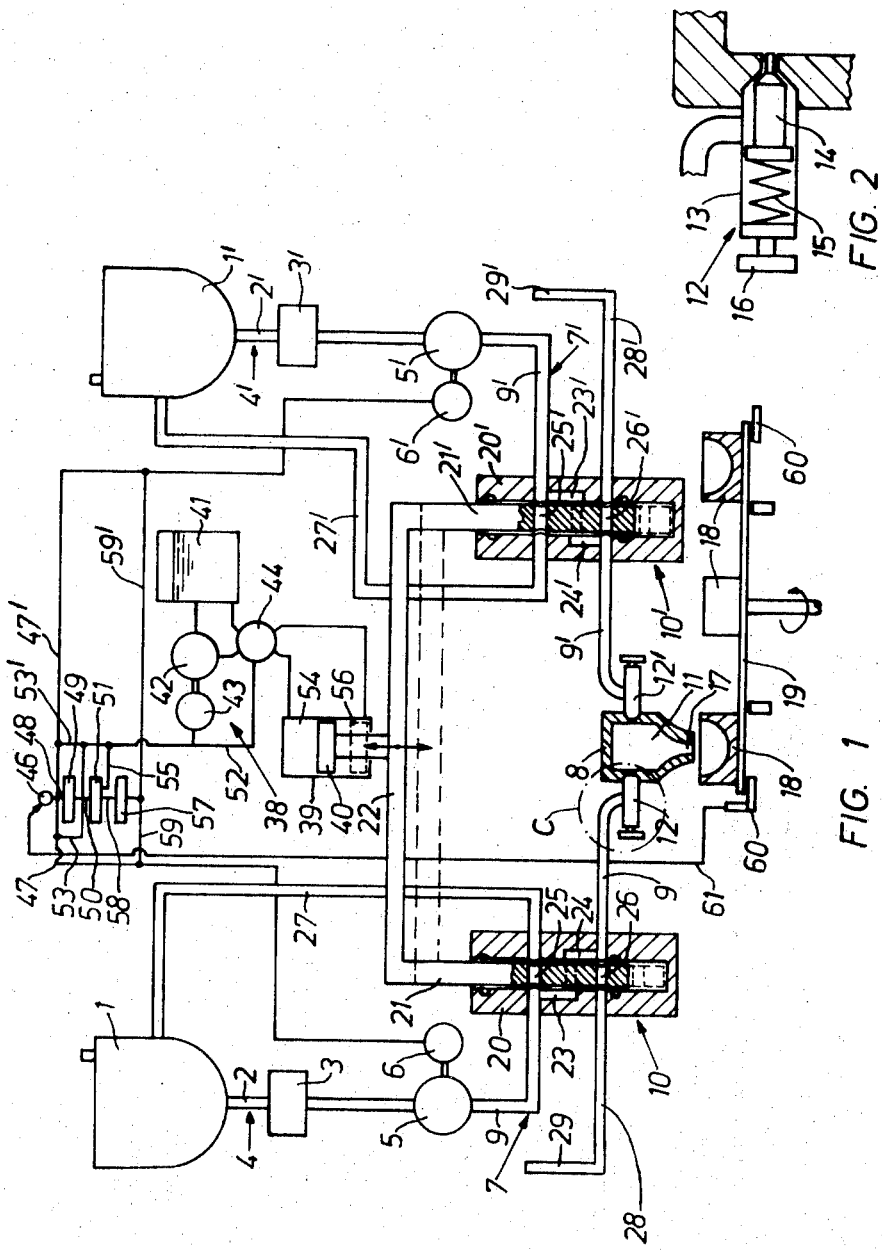

MACHINE FOR INTERMITTENTLY FILLING MOULDS OR CAVITIES WITH A REACTIVE PLASTICS-FORMING, MORE PARTICULARLY FOAM-FORMING MIXTURE

This invention relates to a machine for intermittently filling moulds or cavities with a reactive mixture of at least two free-flowing components which, when mixed form plastics more particularly foams, the machine consisting of storage vessels for the components which, together with pipe sections leading to pumps, represent suction-side pipe systems for each component, whilst pipe section leading from the pumps through control slides to a mixing head provided with an outlet opening represent pressure-side pipe systems for each components which comprise shut-off members arranged on the mixing head, the control slides coupled with one another in terms of movement technology, through their guide channels, a) connecting the pumps with the mixing head in the "throughflow position" and b) interrupting the pipe systems in the "interrupting position."

The object of the invention is to produce plastics articles, more particularly foam articles, and to fill hollow bodies with a mixture of at least two reaction components. For example, isocyanate and polyol are used as reaction components for the production of foam articles based on polyurethane.

Articles of the kind in question are preferably produced by filling moulds. In many cases the cavities within hollow bodies are also filled with foam in order to obtain greater rigidity. In the first case, the plastics articles or foam plastics articles have visible surfaces which should not show any faults. In the second case, high-strength foam plastics free from such faults as bubbles, cracks, etc. are required in order to impart particularly good strength properties to the foam-filled hollow body. In many cases, this also applies as regards plastics articles or foam articles with visible surfaces. Basically, these requirements apply both as regards solid plastics articles or plastics-filled hollow bodies of a certain quality and also as regards those of elastic, semi-elastic or even hard plastics foam or hollow bodies filled with foams of this kind.

Potential applications include in particular vehicle construction of any kind, the building industry and the furniture industry.

In order to avoid faults of the kind referred to, the shut-off members in the mixing head should open and close as far as possible at the same time to prevent premature or delayed entry of the components. If this is not done, the excess component is unable to react through the absence of the associated quantity of the other component, and the aforementioned faults are thus formed. In order to avoid, this, a variety of different measures has already been taken with some degree of success.

However, one problem which has remained unsolved is that of leakage of the shut-off members on the mixing heads, especially in cases where the components are sprayed under pressure into the mixing chamber. Although when closed the shut-off members, consisting for example of tap plugs, slides or spring-loaded adjustable-pressure nozzles, do not leak providing they are relatively new, they do in practice being to leak after only a short period of service. Under the effect of this phenomenon, leakage liquid accumulates in relatively small quantities during the intervals between the filling operations of the moulds or hollow bodies. During the next filling operation, these relatively small quantities, without being mixed, are ejected from the mixing chamber into the mould or into the cavity because due to the effect of gravity they have already moved into the vicinity of the outlet opening of the mixing chamber. These quantities of leakage liquid also form the undesirable faults on and in the finished articles.

Accordingly, the problem which the invention seeks to solve is to provide a machine in which leakage of the shut-off members is avoided, thus avoiding the aforementioned faults in the production of plastics articles and in the filling of cavities.

According to the invention, this problem is solved by virtue of the fact that the control slides comprise additional guide channels which when the slides are in the interrupting position, connect those sections of the pressure-side pipe sections which extend between the control slides and the shut-off members with relief systems. In this way, the shut-off members are relieved of the working pressures, which amount to between about 5 and 400 atms. and even higher, thus avoiding leakage unless the sealing surfaces of the shut-off members are very worn.

One machine with control slides of this kind is already known. The function performed by the control slides is to recycle the components to the suction-side pipe systems during the intervals between filling and only to allow the components to flow to the mixing head during the filling operations. However, these control slides are used in a so-called low-pressure machine in which the components are introduced into the mixing chamber with relatively little pressure. Nor does this known machine have any shut-off members on the mixing head so that the control slides themselves act as the shut-off members, but actually inside the pipes rather than immediately on the mixing head. In this case, the component residues remaining in the pipes as far as the control slides continue to flow following the interruption in delivery so that the aforementioned faults occur. In addition, these machines are used solely for the manufacture of low-quality foams of the kind used for example as bath sponges, for insulation purposes, for decorative purposes or as low-quality filling for cushions, etc. The foams in question are generally produced in blockform in which serious faults can be cut out and minor faults ignored. Accordingly, this known machine cannot be compared in its function with the machine according to the invention.

In order to relieve the shut-off members from the working pressures of the components during the interval times, it has of course also been proposed to allow the pumps to function only during the working periods. However, this calls for a brief warmup period in order to bring the pressure-side pipe system to the working pressure. In the case of shut-off members in the form of slides or plugs, leakages can occur even before opening when this working pressure is being built up. In cases where spring-loaded nozzles are used, the nozzles can also leak before the working pressure is reached. More particularly, "fluttering" of the closure members of the nozzles under the effect of pressure surges (pulsations in the case of multiple-piston pumps) can allow relatively large quantities of the reaction components to flow prematurely into the mixing chamber. Accordingly, this machine is also unsuitable for the production of particularly high-quality plastics articles.

By contrast, the machine according to the invention has the distinct advantage that the pipe section extending between the control slides and the shut-off members always remain filled. When the control slide is switched over to the throughflow position, the working pressure generated by the pump is immediately effective because as a rule the liquids delivered are incompressible so that the shut-off members reeive the working pressure in sudden bursts. In cases where spring-loaded nozzles are used, the nozzles open suddenly. Where automatically controlled shut-off members are used, they are preferably coupled with the control slides in terms of movement technology. The machine according to the invention can be operated for example in such a way that the pumps deliver continuously and during the interval times the delivered components are pumped back to the suction-side pipe systems. In the case of certain chemical components, however, continuous repumping is harmful because gases which are dissolved in the components escapes from the liquid and forms bubbles under the effect of the permanently recurring release of pressure. These dissolved gases are extremely important, especially in the formation of foams, because they represent the starting points for the foaming reaction.

In cases where sensitive components of this kind are processed, it is better when operating the machine according to the invention to make use of the possibility of switching off the pumps during the interval times and switching them on only shortly before the beginning of the next working cycle, for example between about half a second and five seconds beforehand, or longer if necessary, so that the full working pressure has been reached at the beginning of the next working cycles. The actual working period then begins with the opening of the control slides and optionally the shut-off members providing the shut-off members are not of the kind which respond to the working pressure (spring-loaded nozzles). A similar method of operation is recommended for the end of the working period in order to prevent the shut-off members from fluttering as the working pressure falls. This is prevented, in the case of pumps which continue to function, by switching the control slides to the interrupting position and only switching off the pumps shortly afterwards after a period of between about one tenth of a second to one second. Switching of the control slides is accompanied by a sudden release of the working pressure from the pipe sections between the control slides and the shut-off members to the relief pressure envisaged. This sudden relief from the working pressure amounting for example to between 5 and 400 atms and more, doe not cause any fluttering of the shut-off members when the pumps are switched off in contrast to the comparatively slow fall in pressure.

The invention allows various advantageous embodiments for the configuration of the relief systems. In a first embodiment, the relief systems are in the form of pipe sockets that are open toward the atmosphere. This has the advantage of being cheap. However, there is a danger of dirt entering the open pipe sockets. There is no danger of the components flowing out through the open pipe sockets provided they are directed upwards and, in the interest of safety, terminate somewhat above the liquid level. According to another embodiment, the relief systems are in the form of pipe sockets, in whose ends plungers are arranged under a predetermined spring pressure. The advantage of this embodiment is that the components do not have to be relieved of pressure to atmospheric pressure, as a certain pressure which is harmless to the operation of the machine can be maintained. It is even possible when these plungers to apply a reduced pressure to the components so that the liquid is sucked back from the shut-off members in order to relieve the shut-off members in the opposite direction so that leakage is safely avoided. According to a third alternative embodiment, the relief systems are in the form of relief pipes which open into the associated suction-side pipe systems. The relief pipes can open for example into the return pipes in cases where the recycling principle is used. However, they can also open into the suction-side pipes between the storage vessel and pump or into the storage vessel itself. In this embodiment, the initial pressure of 3 to 4 atms. normally applied in the storage vessels also acts on the shut-off members. Pressures of this magnitude are still below the leakage limit.

One embodiment of the invention is described by way of example in the following and illustrated purely diagrammatically in the accompanying drawings, wherein:

FIG. 1 illustrates the machine as a whole.

FIG. 2 illustrates detail C of FIG. 1 on a larger scale.

Figure 3:
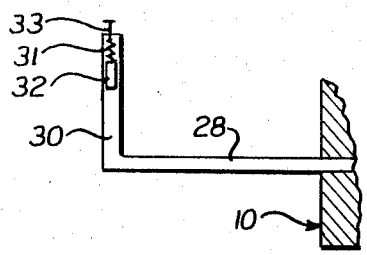
FIGS. 3–6 show variants of the relief systems.

Reaction components A and B flow from storage vessels 1 and 1', in which they are under an initial pressure of 3 atms., into pipe sections 2 and 2' in which filters 3 and 3' are arranged. The parts 1, 1' 2,2' and 3,3' together form a suction-side pipe systems 4,4'. They open into axial piston pumps 5 and 5', functioning as metering pumps, which are actuated by drives 6 and 6' which are coupled together.

The pumps 5 and 5' are adjoined by pressure-side pipe systems 7 and 7' which open into a mixing head 8. The pressure-side pipe systems 7 and 7' consist of pipe sections 9 and 9' in which control slides 10 and 10' are arranged.

Nozzles 12 and 12' acting as shut-off members are arranged at the end of the pipe sections 9 and 9' where they open into a mixing chamber 11. According to FIG. 2, these nozzles are made up of a housing 13, a needle 14, a spring 15 and an adjusting screw 16.

The mixing head 8 is provided with an outlet opening 17 from which the mixture prepared from the components A and B is introduced into the mixing chamber 11 is discharged into a mould 18 below mounted on a turntable 19.

The control slide 10 and 10' consist of slide housings 20 and 20' and of slides 21 and 21' which are rigidly interconnected by a yoke 22. The slides 21 and 21' and the yoke 22 are shown in solid lines in the interrupting position. The throughflow position is represented by chain lines. At the inlet end, the pipe sections 9 and 9' open into the slide housings 20 and 20' in guide channels 23 and 23'. At the output end, the pipe sections 9 and 9' extending between the control slides 10 and 10' and the mixing head 8 lead away from guide channels 24 and 24' which overlap with the guide channels 23 and 23' but are separated from them in the interrupting position by the slides 21 and 21'. Guide channels 25 and 25', 26 and 26' are arranged in the form of bores in the slides 21 and 21'. In the interrupting position, the guide channels 25 and 25' connect the inlet-end pipe sections 9 and 9' with return lines 27 and 27' which open into the storage vessels 1 and 1'. At the same time, the guide channels 26 and 26' connect the output-end pipe sections 9 and 9' with relief systems 28 and 28'. In the throughflow position, the guide channels 25 and 25' connect the guide channels 23 and 23' with the guide channels 24 and 24'. In this position, the guide channels 26 and 26' do not have any function.

The relief systems 28 and 28' are shown in five different variants in FIGS. 1 and 3–6:

According to FIG. 1, the relief systems 28 and 28' end in upwardly directed pipe sockets 29 and 29' that are open towards the atmosphere.

According to FIG. 3, the relief systems 28 and 28' terminate in pipe socket 30 and 30' in which plungers 32 and 32' are arranged loaded by springs 31 and 31'. They are designed to be adjusted to the required relief pressure by means of the adjusting screws 33 and 33'.

Figure 4:
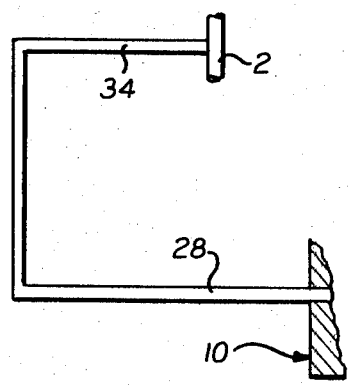

In FIG. 4, the relief systems 28 and 28' open through pipes 34 and 34' into the suction-side pipe sections 2 and 2'.

Figure 5:
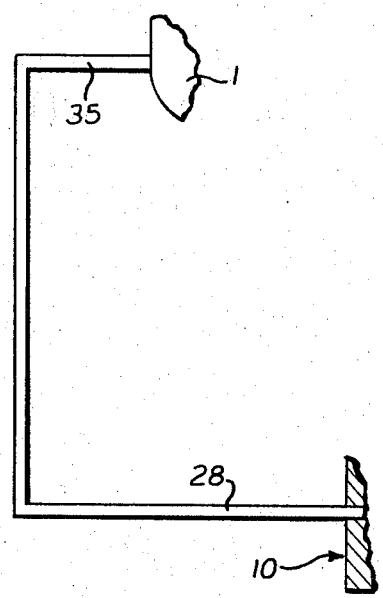

In FIG. 5, the relief systems 28 and 28' open through pipes 35 and 35' directly into the storage vessels 1 and 1'.

Figure 6:
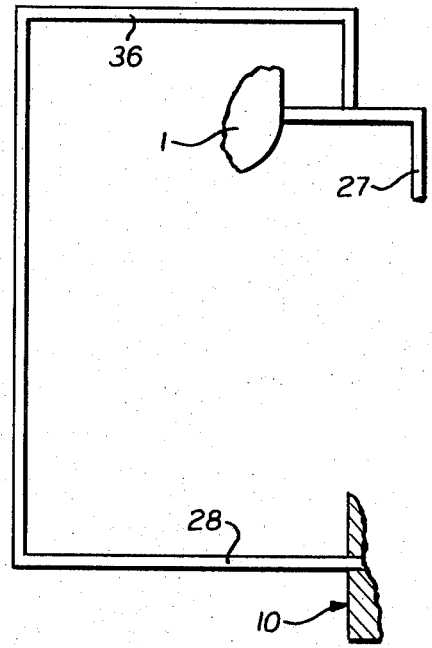

In FIG. 6, the relief systems 28 and 28' are in the form of pipes 36 and 36' opening into the return pipes 27 and 27'.

The yoke 22 is actuated by a hydraulic system 38. This hydraulic system consists of a hydraulic cylinder 39 with a double-acting piston 40, a storage vessel 41 for hydraulic liquid, a pump 42 with drive means 43 and a multiway valve 44.

Finally, the machine also includes the control section 45 whose structure and operation can best be described by explaining the mode of operation of the machine:

By depressing a starter button 46, the drives 6 and 6' of the pumps 5 and 5' are switched on through 47 and 47' so that the pumps 5 and 5' are started up. The control slides 10 and 10' are in the interrupting position. Simultaneously with the drives 6 and 6', a time relay 49 responds through 48, being set to a time interval of 5 seconds which experience has shown to be sufficient for building up the working pressure (It is possible with equal effect to use a switch which responds to the working pressure). On expiry of the time interval in the time relay 49, a time relay 51 is switched on through 50, being adjusted to the opening time for the control slides 10 and 10'. This opening time is adapted to the quantity of the components required to produce a given plastics article. At the same time as the time relay 51 is switched on, the hydraulic system 38 is actuated through 52 and in addition the pumps 6 and 6' continue operating through 47,53, and 47', 53'. The pump 42 is driven by the drive 43 which is switched on by the time relay 51 and through 52 and, with the multi-way valve 44 in the corresponding position, forces hydraulic liquid in sudden surges from the reservoir 41 into the space 54 of the hydraulic cylinder 39 so that the control slides 10 and 10' are brought into the throughflow position. The drive 43 is then automatically switched off. The guide channels 25 and 25' in the slides 21 and 21' then guarantee the flow of components A and B from the storage vessels 1 and 1' to the mixing head 8. When the channels 25 and 25' are pushed into the pressure-side pipe sections 9 and 9', the liquid situated in the pipe sections 9 and 9' extending between the control slides 10 and 10' and the mixing head 8, suddenly receive the working pressures of the components. On account of their incompressibility, the liquids propagate the working pressures without delay so that the inlet nozzles 12 and 12' respond to the working pressures and open suddenly. On expiry of the time interval provided for by the time relay 51, the drive 43 of the pump 42 is switched on agin through 55,52 so that the hydraulic liquid is forced into a space 56 of the hydraulic cylinder 39. In this way, the control slides 10 and 10' are pushed suddenly into the interrupting position. Those parts of the pipe sections 9 and 9' extending between the control slides 10 and 10' and the mixing head 8 are connected through the guide channels 26 and 26' with the relief systems 28 and 28' simultaneously with the operations described above, so that these parts are relieved to the predetermined relief pressure. The drive 43 is automatically switched off. Simultaneously with actuation of the drive 43 and switching of the multiway valve 44, another time relay 57 is switched on through 58. This time relay is set to one tenth of a second and, at the end of this time interval, the drives 6 and 6' of the pumps 5 and 5' are switched off through 59, 47 and 59', 47'. The turntable 19 then brings a new mould 18 beneath the discharge opening 17 of the mixing head 8. Switch contacts 60 arranged on the turntable 19 and each associated with one mould 18 make a circuit 61 which actuates the starter button 46 again. The cycle is then repeated.

What we claim is:

1. A machine for intermittently filling moulds or cavities with a mixture of at least two free-flowing components, the machine comprising a mixing head for mixing the components and having inlets for the components, shut-off members for closing of the inlets, and an outlet for discharging the mixture, the machine further comprising a supply system for supplying the components to the mixing head, the supply system comprising a suction side system for each component, each suction side system comprising a pump, and a pressure side pipe system for each component, each pressure side system comprising a pipe section leading from the pump for its component through control slides to the mixing head, the control slides being coupled with one another and provided with guide channels which are adapted to connect the pumps with the mixing head in a throughflow position, the guide channels interrupting the pipe systems in an interrupt position, the control slides comprising additional guide channels which, in the interrupt position, connect with the pipe sections between the control slides and the shut-off members of the mixing head, and pressure relief systems which connect with said additional guide channels when the control slides are in the interrupt position.

2. A machine according to claim 1, wherein the relief systems are in the form of pipe sockets which are open to the atmosphere.

3. A machine according to claim 1, wherein the relief systems are in the form of pipe sockets in whose ends are arranged plungers under a predetermined spring pressure.

4. A machine according to claim 1, wherein the relief systems are in the form of relief pipes each opening into the associated suction-side system.

5. A machine according to claim 4, wherein each suction side system includes a storage vessel and the relief pipes open into the storage vessels.

6. A machine according to claim 4, each suction side system including a pipe section connected to the pump inlet of the pump thereof, and wherein the relief pipes open into the inlet pipe sections.

7. A machine according to claim 4, and return pipes which lead to the suction side systems and which branch from the pressure side systems before or from the control slides, the relief pipes opening into said return pipes.

8. A machine according to claim 1, wherein the pumps are axial piston pumps.

9. A machine according to claim 8, and control means for intermittently operating the pumps so that the pumps are operating with the control slides are in the throughflow position and are shut down when the control slides are in the interrupt position.

10. A machine according to claim 9, said control means including a time relay for providing a time interval between movement of the control slide to the interrupt position and shutting down of the pumps.

11. A machine according to claim 1, and control means for intermittently operating the pumps so that the pumps are operating with the control slides in the throughflow position and are shut down when the control slides are in the interrupt position.

12. A machine according to claim 11, said control means including a time relay for providing a time interval between movement of the control slide to the interrupt position and shutting down of the pumps.

* * * * *

PO-1050
(5/69)

UNITED STATES PATENT OFFICE
CERTIFICATE OF CORRECTION

Patent No. 3,658,852          Dated April 25, 1972

Inventor(s) Ludwig Schuster and Horst Pommer

It is certified that error appears in the above-identified patent and that said Letters Patent are hereby corrected as shown below:

Column 2, line 17, "nitrgoen" should read -- nitrogen --.

Column 3, line 39, "iminecobalt" should read -- iminocobalt --.

Column 3, claim 1, that portion of the formula reading
"O-C" should read --   O-C   --.
  |                      |
  $R^3$                  $R^3$ Signed and sealed this 28th day of November 1972.

(SEAL)
Attest:

EDWARD M. FLETCHER, JR.          ROBERT GOTTSCHALK
Attesting Officer                Commissioner of Patents

PO-1050
(5/69)

UNITED STATES PATENT OFFICE
CERTIFICATE OF CORRECTION

Patent No. 3,858,852                    Dated January 7, 1975

Inventor(s) Karl Breer and Klaus Nadolski

It is certified that error appears in the above-identified patent and that said Letters Patent are hereby corrected as shown below:

Column 7, line 12, (claim 9, line 3), cancel "are" (second occurrence).

Signed and sealed this 13th day of May 1975.

(SEAL)
Attest:

RUTH C. MASON
Attesting Officer

C. MARSHALL DANN
Commissioner of Patents
and Trademarks